United States Patent [19]

Sugimoto et al.

[11] Patent Number: 5,623,169
[45] Date of Patent: Apr. 22, 1997

[54] ELECTRICAL WIRING HARNESS STRUCTURE FOR VEHICLE

[75] Inventors: Nobuyoshi Sugimoto; Mitsuru Anma; Hideaki Masui, all of Shizuoka-ken; Osamu Michihira; Seiji Hirano, both of Hiroshima; Masaaki Shimizu, Iwakuni, all of Japan

[73] Assignees: Yazaki Corporation, Tokyo; Mazda Motor Corporation, Hiroshima, both of Japan

[21] Appl. No.: 311,443

[22] Filed: Sep. 22, 1994

Related U.S. Application Data

[63] Continuation of Ser. No. 858,528, Mar. 27, 1992, abandoned.

[30] Foreign Application Priority Data

Mar. 28, 1991 [JP] Japan ................... 3-064332
Feb. 25, 1992 [JP] Japan ................... 4-037373

[51] Int. Cl.$^6$ ................... H02G 3/02; B60R 16/02
[52] U.S. Cl. ................... 307/10.1; 307/147
[58] Field of Search ................... 307/9.1, 10.1, 307/38, 42, 40, 147; 361/749, 826

[56] References Cited

U.S. PATENT DOCUMENTS

| | | | |
|---|---|---|---|
| 4,156,151 | 5/1979 | Borroni | 307/10.1 |
| 4,652,853 | 3/1987 | Tagami et al. | 307/10.1 X |
| 4,715,031 | 12/1987 | Crawford et al. | 370/85 |
| 4,849,967 | 7/1989 | Harris | 370/85 |
| 4,887,263 | 12/1989 | Steely | 307/10.1 |
| 4,941,258 | 7/1990 | Wright | 307/10.1 |
| 4,942,571 | 7/1990 | Möller et al. | 307/10.1 |
| 4,950,168 | 8/1990 | Watanabe et al. | 439/34 |
| 4,956,561 | 9/1990 | Tamer | 307/10.1 |
| 4,956,748 | 9/1990 | Yamamoto | 361/394 |
| 5,168,272 | 12/1992 | Akashi et al. | 307/10.1 X |
| 5,508,689 | 4/1996 | Rado et al. | 307/10.1 |

FOREIGN PATENT DOCUMENTS

| | | |
|---|---|---|
| 0082300 | 6/1983 | European Pat. Off. . |
| 0213576 | 3/1987 | European Pat. Off. . |
| 0341080 | 11/1989 | European Pat. Off. . |
| 0417480 | 3/1991 | European Pat. Off. . |
| 2240958 | 2/1974 | Germany . |
| 57-38457 | 8/1982 | Japan . |
| 62-105876 | 7/1987 | Japan . |
| 2110891 | 6/1983 | United Kingdom . |

OTHER PUBLICATIONS

EPC Search Report dated Jul. 31, 1992.
EPC Search Report dated May 19, 1994.

*Primary Examiner*—Fritz Fleming

[57] ABSTRACT

An electrical wiring harness structure constituting a multiplex transmission network in a vehicle, in which a vehicle body is divided into a plurality of blocks, electrical components are mounted in units of blocks to constitute modules, and thereafter, the modules are combined to complete a vehicle body. The structure includes control nodes, arranged in units of modules, for controlling communications of the electrical components mounted on the corresponding modules, wiring harnesses, arranged between the adjacent modules, for forming a transmission path for performing communications among the control nodes, and connectors for connecting the wiring harnesses and the control nodes.

42 Claims, 12 Drawing Sheets

ELECTRICAL WIRING HARNESS STRUCTURE FOR VEHICLE

This application is a continuation of U.S. patent application Ser. No. 07/858,528, filed Mar. 27, 1992, now abandoned.

BACKGROUND OF THE INVENTION

The present invention relates to an electrical wiring harness structure for a vehicle, for constituting a multiplex transmission network in a vehicle.

As a conventional body structure of a vehicle, a so-called unit body structure is adopted, and a desired effect can be obtained from the viewpoint of improvement in mechanical strength of the vehicle body. However, since the unit body structure forms a passenger room space before equipments (e.g., seats) in the passenger room are assembled, these equipments in the passenger room can only be assembled in the passenger room space from aside through a door opening portion, resulting in very poor operability.

As a means for solving this problem, as disclosed in Japanese Utility Model Laid-Open No. 62-105876, a technique for dividing a vehicle body into upper and under bodies in advance is known. With this dividing technique, the equipments (e.g., seats) in the passenger room can be assembled from above to a floor portion mounted on the under body before the upper body is joined to the under body, thereby greatly improving operability. As an improvement to this technique, the following method is also proposed. In this method, a vehicle body is divided into not only upper and under bodies, but also a block of an engine room portion, a block of a passenger room portion, and a block of a luggage room portion in the front-to-rear direction of the vehicle body, and after equipments and electrical components necessary for these blocks are assembled, these blocks are connected to complete a vehicle body. With this method, these blocks are parallelly assembled in corresponding assembling processes, and thereafter, are combined to complete a vehicle body, thus further improving operability.

However, since the number of electrical components such as switches, sensors, actuators, and the like is increased along with development of electronics for vehicles, enlarged and complicated wiring harnesses for connecting electrical components pose a serious problem. For this reason, as described above, when a vehicle body is divided into a plurality of blocks, and the blocks are combined after equipments and electrical components are assembled in units of blocks, the number of wires for connecting the electrical components in each block becomes very large, and a cumbersome operation is required to connect these wires in units of blocks, resulting in many connection errors, and the like. More specifically, a method of dividing a vehicle body into modules, and assembling a vehicle in units of modules is being promoted, while a problem of a complicated wiring structure caused by complicated electrical components is left unsolved. In practice, it is not easy to realize a divisional assembling method of a vehicle body.

As a method of eliminating enlarged and complicated wiring harnesses for connecting the electrical components, a multiplex transmission system, in which one transmission path is commonly used by a large number of electrical components, has received a lot of attention. More specifically, nodes for various electrical components, and control nodes for engine control (EGI), four-wheel steering control (4WS), anti-lock brake control (ABS), and the like are connected to a multiplex transmission path, thus constituting a time-divisional multiplex transmission network. As a wiring harness constituting the multiplex transmission path, a communication line comprising a twisted pair wire is normally used.

The application of the multiplex transmission network to a vehicle is advantageous from the viewpoint of a decrease in the number of wires used in signal transmission among blocks, and helps to achieve a module structure of a vehicle body.

As a conventional electrical wiring harness structure upon constitution of the multiplex transmission network in a vehicle, a structure disclosed in Japanese Patent Laid-Open No. 2-184210 is known. This application relates to a branch system of a transmission path of a multiplex transmission network. Of the communication line constituting the transmission path, a portion to be branched is led into a housing of a branch connector. A branch bar having a forked end is arranged in the housing. Male terminals are fixed to the distal ends of the forked end side, and a female terminal is fixed to the opposite end. The communication line led into the housing is cut, and the female terminals are fixed to the two cut ends of the communication line. The female terminals are connected to the male terminals of the branch bar. When the branch connector whose female terminal of the branch bar extends outwardly is used, male-female connection to a connector of the branch transmission path can be realized.

However, even if the conventional electrical wiring harness structure is applied to merely branch signal lines, the above-mentioned module structure of the vehicle body cannot be satisfactorily realized.

SUMMARY OF THE INVENTION

The present invention has been made in consideration of the above situation, and has as its principal object to provide an electrical wiring harness structure for a vehicle, which divides a vehicle body into vehicle body blocks, and combines the vehicle body blocks to assemble the vehicle body after equipments and electrical components are equipped in the corresponding vehicle body blocks.

It is another object of the present invention to provide an electrical wiring harness structure for a vehicle, which adopts a multiplex transmission network, which can realize a module structure of a vehicle body.

It is still another object of the present invention to provide an electrical wiring harness structure for a vehicle, which, upon assembling of a vehicle body in units of modules, connections of wiring lines among the modules are attained through connectors, thus promoting automatic assembling of a vehicle body.

It is still another object of the present invention to provide an electrical wiring harness structure for a vehicle, which divides a vehicle body into blocks, and parallelly assembles the divided body blocks, thereby improving assembling work efficiency, and reducing assembling cost.

In order to achieve the above objects, an electrical wiring harness structure for a vehicle according to the present invention is characterized by comprising the following arrangement.

That is, there is provided an electrical wiring harness structure for constituting a multiplex transmission network in a vehicle, in which a vehicle body is divided into a plurality of blocks, electrical components are mounted in units of blocks to constitute modules, and thereafter, the modules are combined to complete a vehicle body, comprising: block control nodes, arranged in units of modules, for controlling communications of the electrical components mounted on the corresponding modules; wiring harnesses, arranged between the adjacent modules, for forming a transmission path for performing communications among the block control nodes; and connectors for connecting the wiring harnesses and the block control nodes.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

The preferred embodiment of the present invention will be described in detail below with reference to the accompanying drawings.

Figure 1:
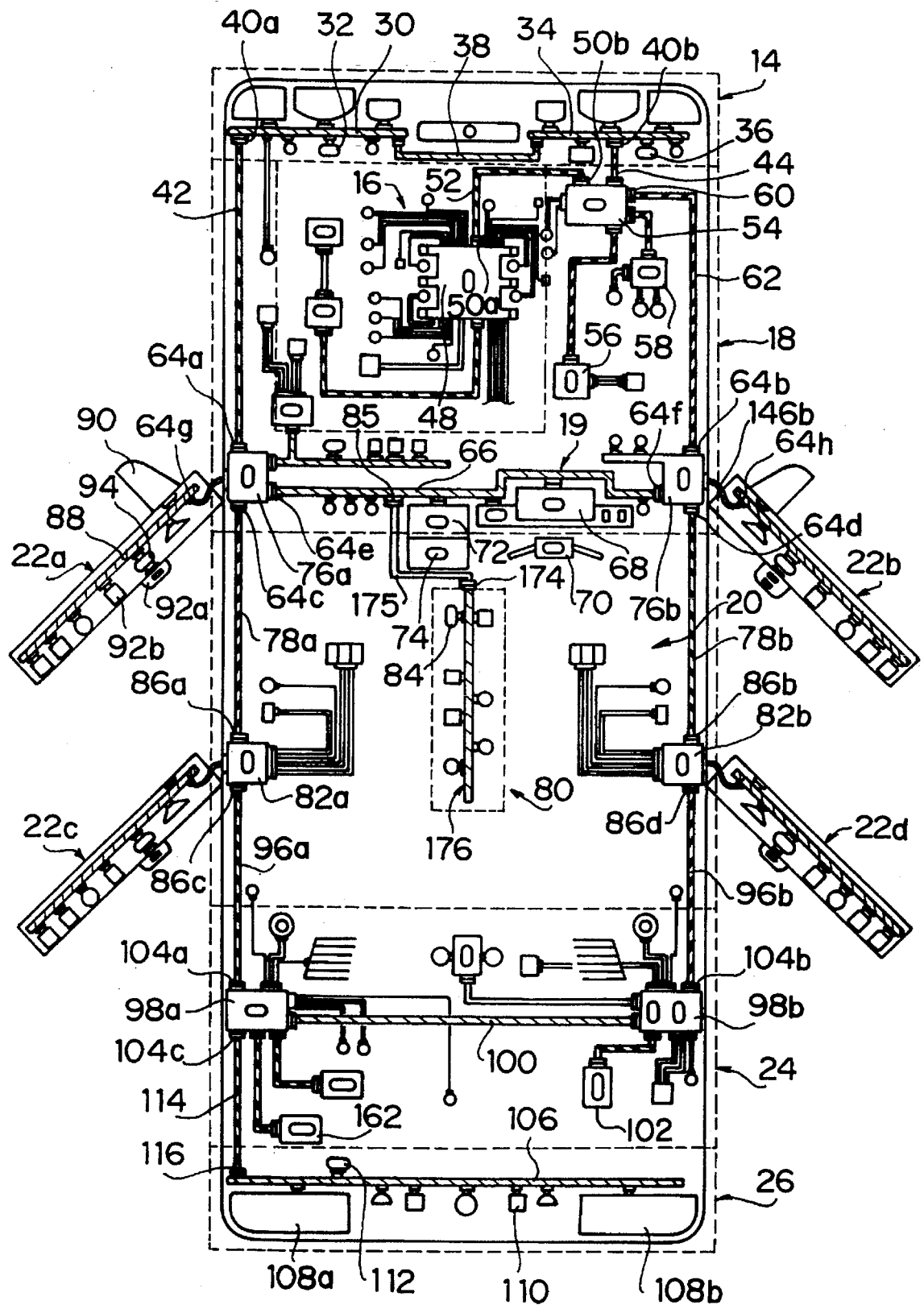
FIG. 1 is a plan view of a vehicle, which adopts an embodiment of an electrical wiring harness structure for a vehicle according to the present invention.
Figure 2:
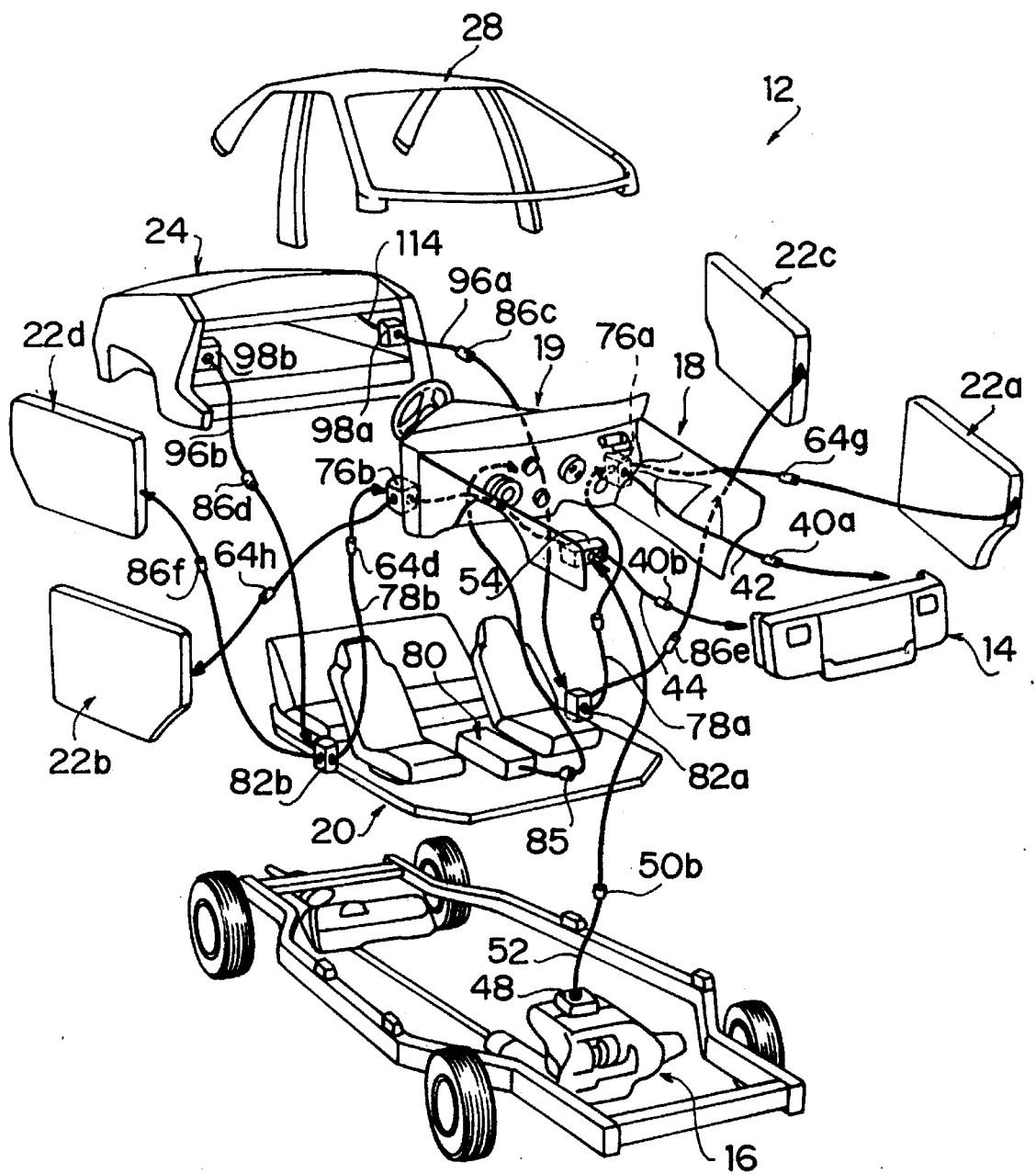
FIG. 2 is a perspective view showing a state wherein the vehicle shown in FIG. 1 is divided into blocks.

FIG. 1 is a plan view of a vehicle, which adopts an embodiment of an electrical wiring harness structure for a vehicle according to the present invention. FIG. 2 is a perspective view showing a state wherein the vehicle of this embodiment is divided into blocks. The arrangement of the electrical wiring harness structure of this embodiment will be described below with reference to FIGS. 1 and 2. As will become understood from the detailed description of the embodiment herein, in this multiplex transmission network control nodes 54, 76a, 76b, 82a, 82b, 98a and 98b comprise main block control nodes, and the other control nodes referred to herein comprise subordinate block control nodes.

As shown in FIGS. 1 and 2, in this vehicle, a vehicle body 12 is constituted by combining a front end block 14, an engine block 16, an engine room block 18, a floor block 20, four door blocks 22a to 22d, a rear block 24, a tail block 26, and a roof block 28, and adopts a module structure. The vehicle body 12 is assembled as follows. That is, after equipments and electrical components are assembled in units of blocks, the blocks are joined by, e.g., welding or bolts, and connectors for connecting the electrical components of the blocks to each other are connected. Note that communications among the electrical components equipped in the vehicle body 12 are performed through a network adopting a multiplex transmission system.

The arrangement of each block will be explained below.

A branch wiring harness 30 comprising a flat cable extends in the right-and-left direction in the left half portion of the front end block 14, and electrical components such as a front lamp, a horn, and the like are connected to the branch wiring harness 30. A control node 32 for simultaneously controlling communications of the plurality of electrical components is further connected to the branch wiring harness 30. The arrangement of the right half portion of the front end block 14 is substantially symmetrical with the left half portion, and a front lamp, and the like are similarly connected to a branch wiring harness 34. Furthermore, a control node 36 for simultaneously controlling communications of the plurality of electrical components is connected to the branch wiring harness 34. The two branch wiring harnesses 30 and 34 are connected through a branch wiring harness 38. Connectors 40a and 40b are respectively arranged at substantially the two end portions of the branch wiring harnesses 30 and 34 constituting the front end block 14. The branch wiring harnesses 30 and 34 are connected to trunk wiring harnesses 42 and 44 arranged in an engine room block 18 and comprising twisted pair wires via these connectors 40a and 40b. The trunk wiring harness is a communication line constituting a transmission path as a main trunk for forming the multiplex transmission network in the entire vehicle.

The electrical components and the control node 32 arranged in the left half portion of the front end block 14 are connected to the trunk wiring harness 42 in the engine room block 18 through the connector 40a. The electrical components and the control node 36 arranged in the right half portion of the front end block 14 are connected to the trunk wiring harness 44 in the engine room block 18 through the connector 40b.

A control node 48 for engine control (EGI) is arranged in the engine block 16, and is connected to an MFB control node 54 (to be described later) through a connector 50a, a trunk wiring harness 52 comprising a twisted pair wire, and a connector 50b. The control node 48 controls communications of electrical components such as an O$_2$ sensor, a knocking sensor, a purge solenoid, and the like arranged near an engine.

A control node 56 for controlling communications of electrical components such as sensors, motors, and the like arranged in the front portion of the engine room block 18, the engine block 16, the front end block 14, and power steering control (SSPS), an ABS hydraulic unit 58 for anti-lock brake control (ABS), and the MFB node 54 as a control node for controlling communications with other blocks, are arranged in the front portion of the engine room block 18.

An instrument panel unit 19 is arranged in the rear portion, i.e., at a side facing a passenger room of the engine room block 18. In the instrument panel unit 19, a branch wiring harness 66 comprising a flat cable extends in the right-and-left direction, and four control nodes, i.e., a meter node 68 comprising, e.g., a speedometer, and the like, a column switch node 70 comprising switches such as an ignition switch, an air conditioner node 72, and an audio node 74, are connected to the branch wiring harness 66. The branch wiring harness 66 is also connected to various electrical components such as switches (e.g., a defroster switch, remote-control mirror switches, and the like), sensors (e.g., a water temperature thermo sensor, an auto-light sensor, and the like), motors for an air conditioner (e.g., a blower motor, a motor for driving an inner/outer air switching damper, and the like), and the like. The branch wiring harness 66 is further connected to a control node for controlling communications of these electrical components.

Right and left cowl nodes 76b and 76a for controlling communications between the node arranged on the branch wiring harness 66 and other blocks (the front end block 14, the door blocks 22a to 22d, the rear block 24, the tail block 26, and the like) are arranged on the two end portions of the instrument panel unit 19. The branch wiring harness 66 is connected between these cowl nodes 76a and 76b through connectors 64e and 64f. Cowl nodes comprise main block control nodes.

The left cowl node 76a is connected to the front end block 14 through the connector 40a, the trunk wiring harness 42, and a connector 64a. The left cowl node 76a is also connected to the front left door block 22a through a connector 64g, and is also connected, through a connector 64c, to a trunk wiring harness 78a extending from a left floor control node 82a (to be described later).

The right cowl node 76b is connected to the MFB control node 54 through a connector 60, a trunk wiring harness 62, and a connector 64b. The right cowl node 76b is connected to the front right door block 22b through a connector 64h, and is also connected, through a connector 64d, to a trunk wiring harness 78b extending from a right floor control node 82b (to be described later).

As will be described in detail later, the wiring harnesses 42, 52, and 62, the MFB control node 54, the SSPS control node 56, the ABS hydraulic unit 58, the branch wiring harness 66, the cowl nodes 76a and 76b, and the like are arranged in the engine room block 18.

The floor block will be described below. A center console unit 80 is arranged at the central portion of the floor block 20.

The center console unit 80 comprises, e.g., switches for a rear air conditioner. A control node 84 for controlling communications of all the electrical components in the center console unit 80 is arranged in the center console unit 80. The center console unit 80 is connected to the branch wiring harness 66 of the instrument panel unit 19 through a connector 85.

The floor control nodes 82a and 82b for controlling communications of electrical components such as power seat motors, seat heaters, and the like arranged for front seats, are arranged on the two side portions of the floor block 20, i.e., near the mounting portions of the rear door blocks 22c and 22d. The left floor control node 82a is connected to the left cowl node 76a through a connector 86a, the trunk wiring harness 78a comprising a twisted pair wire, and the connector 64c. The right floor control node 82b is connected to the right cowl node 76b through a connector 86b, the trunk wiring harness 78b comprising a twisted pair wire, and the connector 64d.

The front door block 22a at the front passenger seat side as one of the four door blocks 22a to 22d will be described below. A branch wiring harness 88 comprising a flat cable is also arranged in the front door block 22a at the front passenger seat side. The branch wiring harness 88 is connected to electrical components such as a remote-control mirror 90, a power window switch 92a, a power window motor 92b, and the like. A control node 94 for simultaneously controlling communications of these electrical components is also connected to the branch wiring harness 88. When the front door block 22a at the front passenger seat side is connected to the engine room block 18, the single connector 64g need only be connected to connect all the electrical components including the control node 94 in the front door block 22a to the left cowl node 76a. More specifically, the front door block 22a is connected to the trunk wiring harnesses 42 and 78a as the main trunks of multiplex transmission communications of the entire vehicle through the single connector 64g.

The wiring harness structures of the remaining three door blocks 22b, 22c, and 22d are substantially the same as that of the door block 22a at the front passenger seat side. The rear door blocks 22c and 22d are connected, through connectors, to the floor control nodes 82a and 82b, which have a function of branching the trunk wiring harnesses 78a and 78b to the rear door blocks 22c and 22d. Since the floor control nodes 82a and 82b having both the branch function of the transmission path to the rear door blocks 22c and 22d, and the communication function associated with the electrical components arranged around themselves are arranged near the mounting portions of the rear door blocks 22c and 22d, the arrangement of the multiplex transmission network can be simplified as compared to a case wherein branch portions for merely branching signal lines, and control nodes for controlling communications of electrical components near them are separately arranged.

Rear control nodes 98b and 98a for controlling communications of electrical components such as power seat motors, seat heaters, and the like arranged for the rear passenger seats are arranged in the right and left end portions of the rear block 24. The rear control nodes 98a and 98b are connected to various control packages such as a total wiring system (TWS), keyless entry, a total managing system (TMS), idle speed control (ASC), auto adjust suspension control (AAS), and the like, distributed to the right and left portions of the rear block 24, for executing control based on information of the entire vehicle. The rear control nodes 98a and 98b are coupled to each other through a branch wiring harness 100 comprising a flat cable. These rear control nodes 98a and 98b are also connected to a control node 102 for four-wheel steering control (4WS), a luggage room switch, a fuel tank unit, and the like, and control communications of these electrical components.

The left rear control node 98a is connected to the floor control node 82a through a connector 86c, a trunk wiring harness 96a, and a connector 104a. The right rear control node 98b is connected to the floor control node 82b through a connector 86d, a trunk wiring harness 96b, and a connector 104b. More specifically, when the rear block 24 is connected to the floor block 20, the trunk wiring harnesses 96a and 96b need only be connected to the rear control nodes 98a and 98b through the two connectors 104a and 104b, thereby connecting all the electrical components including the control nodes in the rear block 24 to the trunk wiring harnesses 96a and 96b of the floor block 20 side.

A branch wiring harness 106 comprising a flat cable extends in the right-and-left direction in the tail block 26. The branch wiring harness 106 is connected to lamps such as rear combination lamps 108a and 108b comprising, e.g., tail lamps, a license plate lamp 110, and the like, and is also connected to a control node 112 for simultaneously controlling communications of these lamps. The branch wiring harness 106 is connected to the left rear control node 98a through a connector 104c, a trunk wiring harness 114, and a connector 116. More specifically, when the tail block 26 is connected to the rear block 24, the trunk wiring harness 114 need only be connected to the branch wiring harness 106 through the single connector 116, thereby connecting all the electrical components including the control node 112 in the tail block 26 to the trunk wiring harness 114 of the rear block 24 side.

As described above, when the front end block 14, the engine block 16, the engine room block 18, the floor block 20, the four door blocks 22a to 22d, the rear block 24, and the tail block 26 are combined, all the control nodes are connected through the trunk wiring harnesses, thus constituting the multiplex transmission network. In addition, when the respective blocks are connected, all the electrical components in the blocks can communicate with the multiplex transmission path through the corresponding control nodes by connecting only the connectors. Therefore, automatic assembling of a vehicle body can be facilitated. In addition, common vehicle constituting parts can be used, resulting in a decrease in cost.

The wiring harness structures of the blocks will be described below with reference to FIGS. 3 to 11.

Figure 3:
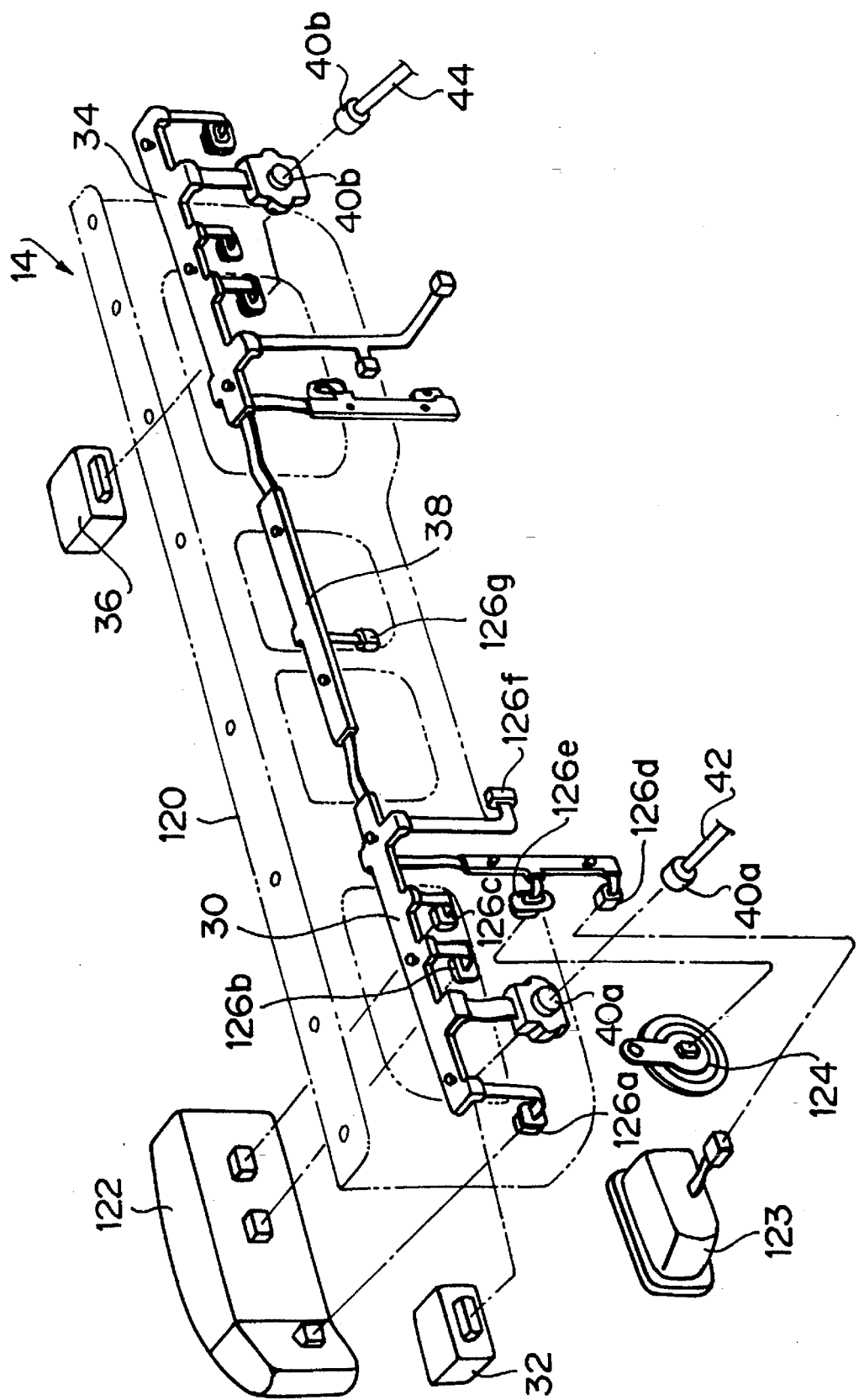
FIG. 3 is an exploded perspective view showing an arrangement of a front end block.

FIG. 3 is an exploded perspective view showing the wiring harness structure of the front end block 14. The front end block 14 is mainly constituted by a shroud panel 120 constituting the main body of the front end block 14, the branch wiring harnesses 30, 34, and 38 fixed to the shroud panel 120, and electrical components fixed to the shroud panel 120, and electrically connected to the branch wiring harnesses 30, 34, and 38.

As shown in FIG. 3, the shroud panel 120 is formed into a planar shape extending in the widthwise direction of the vehicle body. A front lamp 122, a fog lamp 123, a horn 124, and the like are mounted on the front surface of the shroud panel 120, and the branch wiring harnesses 30, 34, and 38 are mounted on the rear surface side thereof.

The branch wiring harnesses 30, 34, and 38 comprise flat cables, and are fixed to the shroud panel 120 to extend along the shroud panel 120 in the widthwise direction of the vehicle body. The branch wiring harnesses 30 and 34 are provided with connectors 126a, 126b, and 126c for connecting the front lamp 122, a connector 126d for connecting the fog lamp 123, a connector 126e for connecting the horn 124, a connector 126f for connecting a radiator fan motor, and the like. A connector 126g for connecting a hood switch is provided to the branch wiring harness 38. The connectors 40a and 40b for connecting the trunk wiring harnesses 42 and 44 to these branch wiring harnesses 30 and 34 are arranged at the end portions of the branch wiring harnesses 30 and 34.

ECU modules 32 and 36 as control nodes for controlling communications between the plurality of electrical components connected to the branch wiring harnesses 30, 34, and 38, and other blocks are connected to the rear portions of these connectors 40a and 40b. Each of the ECU modules 32 and 36 incorporates a CPU module for controlling communications.

Figure 4:
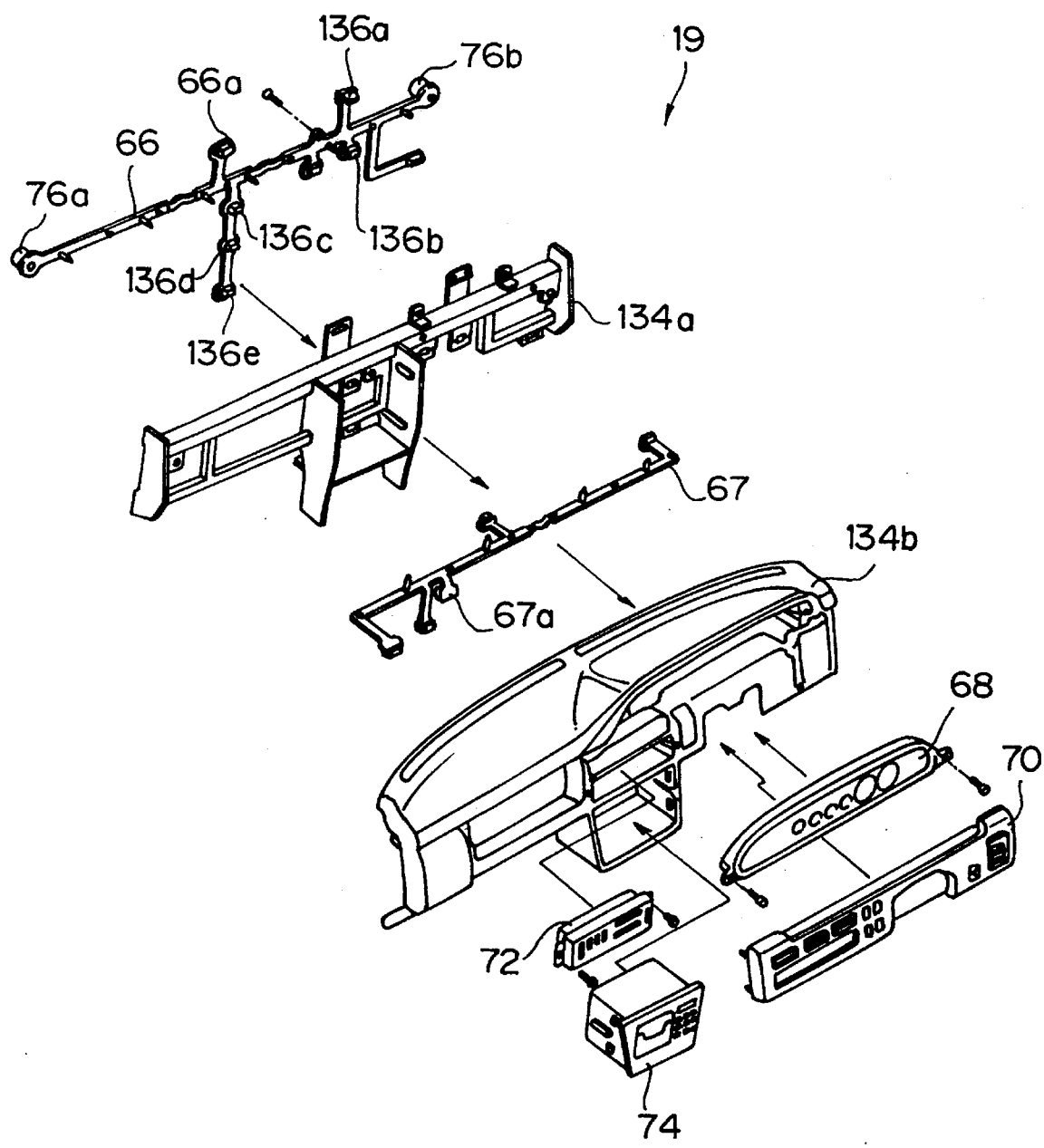
FIG. 4 is an exploded perspective view showing an arrangement of an instrument panel unit.

FIG. 4 is an exploded perspective view showing an arrangement of the instrument panel unit 19. As shown in FIG. 4, in the instrument panel unit 19, the first branch wiring harness 66 and a second branch wiring harness 67, which comprise flat cables, are connected to each other through connectors 66a and 67a. These branch wiring harnesses 66 and 67 are assembled to two structural members 134a and 134b together with the four control nodes, i.e., the meter node 68, the column switch node 70, the air conditioner switch node 72, and the audio node 74. The first branch wiring harness 66 comprises a connector 136a for connecting the meter node 68, a connector 136b for connecting the column switch node 70, a connector 136c for connecting the air conditioner switch node 72, and a connector 136d for connecting the audio node 74, and also comprises a connector 136e for connecting between the instrument panel unit 19 and the center console unit 80.

As described above, the cowl nodes 76a and 76b for controlling communications between the electrical components connected to the branch wiring harness 66 and the electrical components arranged on other blocks are arranged on the two end portions of the branch wiring harness 66.

Figure 5:
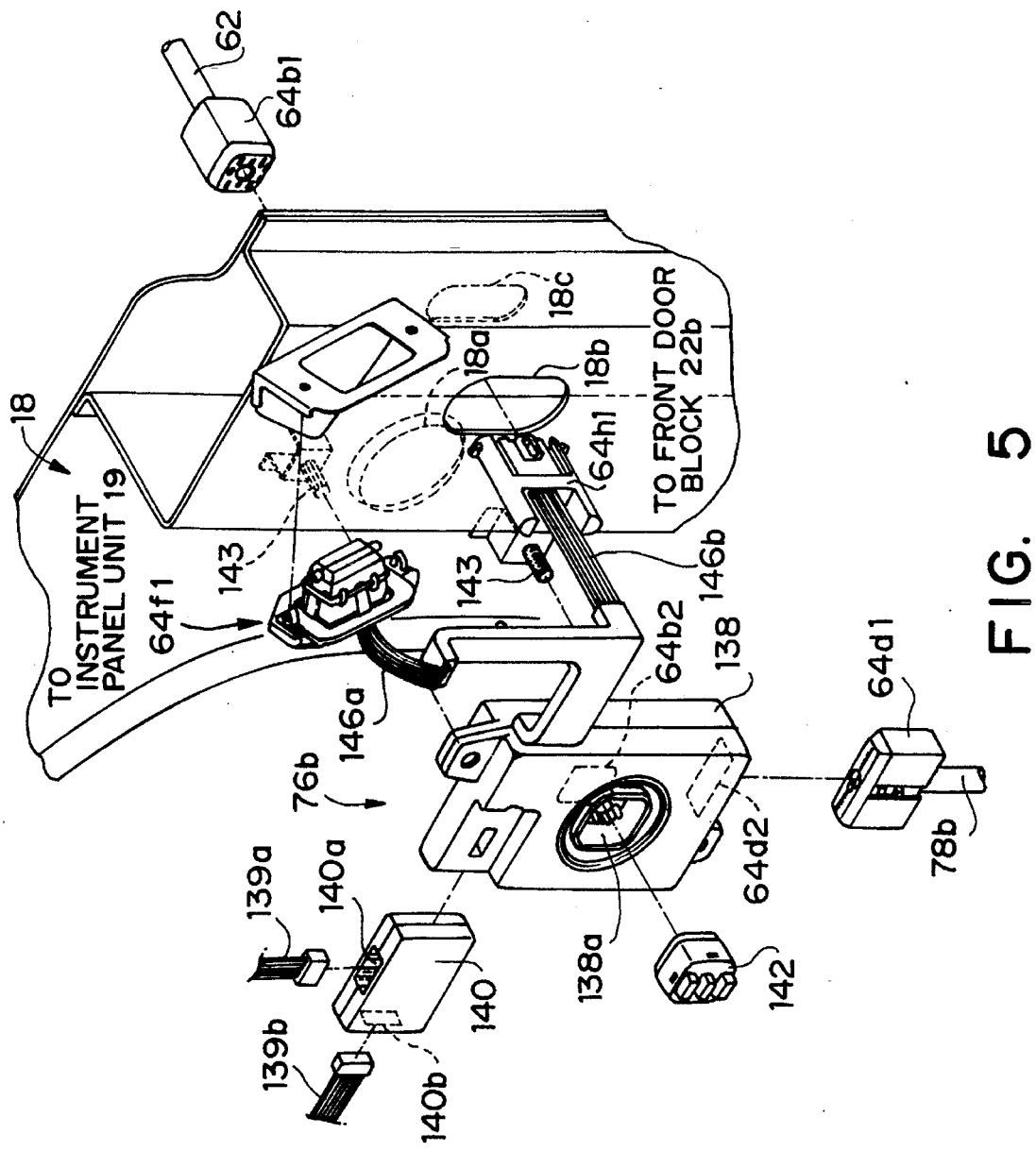
FIG. 5 is a perspective view showing a structure of a cowl node.

FIG. 5 is a perspective view showing the structure of the right cowl node 76b as one of these two cowl nodes 76a and 76b.

As shown in FIG. 5, the cowl node 76b is mainly constituted by a branch box 138, constituting the main body of the cowl node 76b, for branching communication lines from the trunk wiring harness 62 to the instrument panel unit 19 and the front right door block 22b, an ECU module 140, connected to the branch box 138, for controlling communications among blocks, and a fuse holder 142 in which fuses for the electrical components are concentrated. The branch box 138 is mounted on the engine room block 18 via a bolt 143 fixed to the engine room block 18 constituting the vehicle body.

In FIG. 5, a female terminal 138a for receiving the fuse holder 142 is arranged at substantially the central portion of the front surface side of the branch box 138. A female terminal 64b2 is arranged on a portion corresponding to just the rear side of the female terminal 138a. The female terminal 64b2 is connected to a male terminal 64b1 arranged at an end portion of the trunk wiring harness 62 connected to the MFB control node 54. These male and female terminals 64b1 and 64b2 constitute the connector 64b. The male and female terminals 64b1 and 64b2 are connected to each other through an opening 18a formed in the engine room block 18.

A female terminal 64d2 to be connected to a male terminal 64d1 arranged at an end portion of the trunk wiring harness 78b connected to the floor control node 82b is arranged below the branch box 138. These male and female terminals 64d1 and 64d2 constitute the connector 64d.

Branch lines 146a and 146b comprising flat cables including twisted wires for communications extend in two directions from the right side of the branch box 138. A male terminal 64f1 to be connected to the instrument panel unit 19 is attached to the distal end portion of the upwardly extending branch line 146a of these two lines. A male terminal 64h1 to be connected to the front right door block 22b is attached to the distal end portion of the other branch line 146b. The branch line 146b is connected to the front right door block 22b through openings 18b and 18c formed in the engine room block 18.

Furthermore, the ECU module 140 is formed with a female terminal 140a corresponding to a branch line 139a connected to the roof block 28, and a female terminal 140*b* corresponding to a branch line 139*b* connected to, e.g., a pedal assist member, and the like.

With the above mentioned arrangement, the communication lines are branched from the trunk wiring harness 62 to the instrument panel unit 19 and the front right door block 22*b*.

The arrangement of the left cowl node 76*a* is the same as that of the right cowl node 76*b*.

Figure 6:
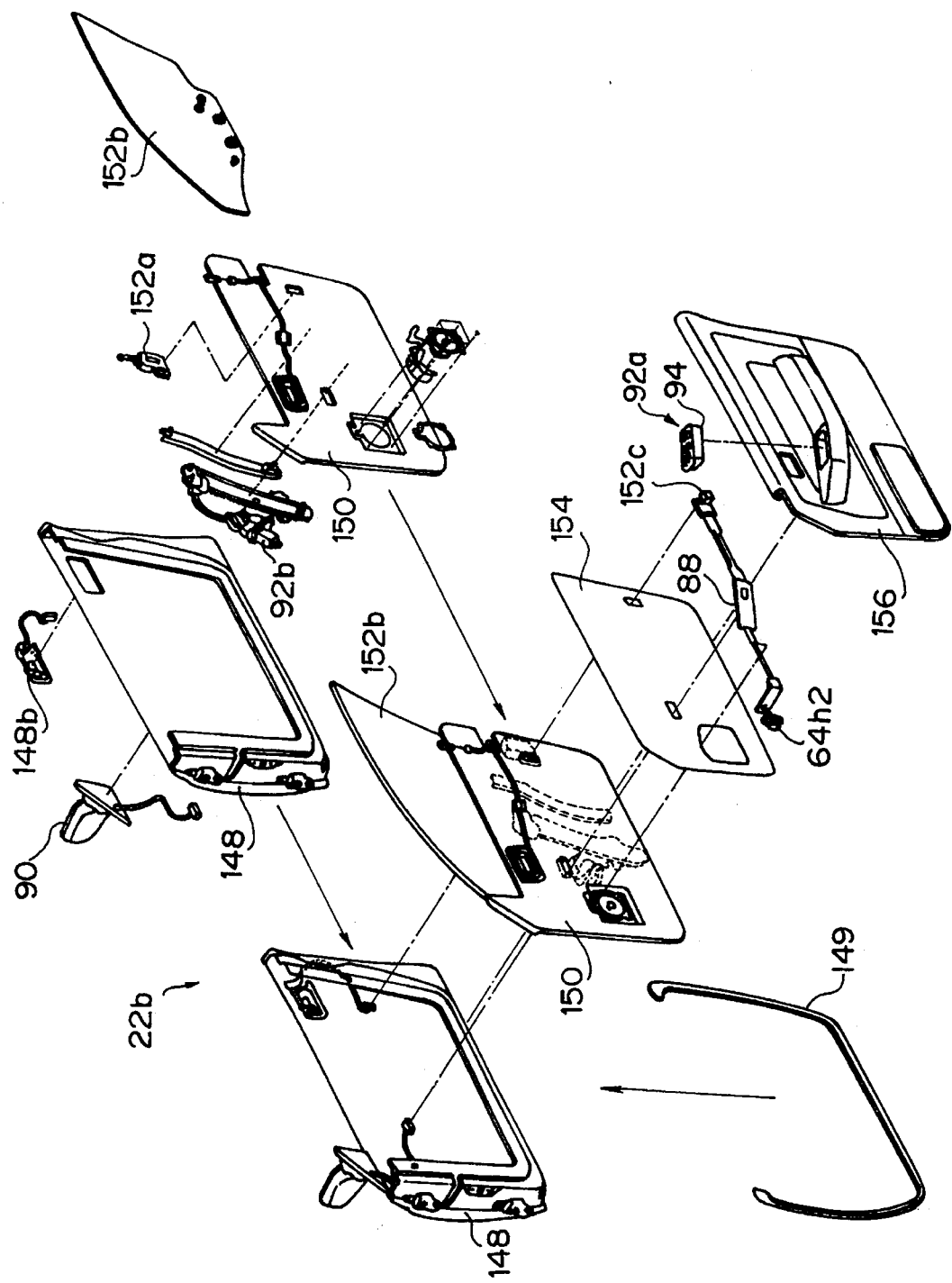
FIG. 6 is an exploded perspective view showing a front right door block.

FIG. 6 is an exploded perspective view of the front right door block 22*b*. As shown in FIG. 6, an outer handle 148*b* and the remote-control mirror 90 are attached to a door outer panel 148. The power window motor 92*b*, a door lock motor 152*a*, and a glass 152*b* are attached to a door inner panel 150, and the branch wiring harness 88 provided with a courtesy lamp 152*c* is attached to the door inner panel 150. A water-proof pad 149, the door inner panel 150, a waterproof sheet 154, and a door trim 156 are attached in turn to the door outer panel 148. Finally, a box of the power window switch 92*a* incorporating the control node 94 is attached to the door trim 156. Thus, all the electrical components including the control node 94 are connected to the branch wiring harness 88. The branch wiring harness 88 has a female terminal 64*h*2 corresponding to the male terminal 64*h*1 at the distal end of the branch line 146*b* branched from the cowl node 76*b*.

Figure 7:
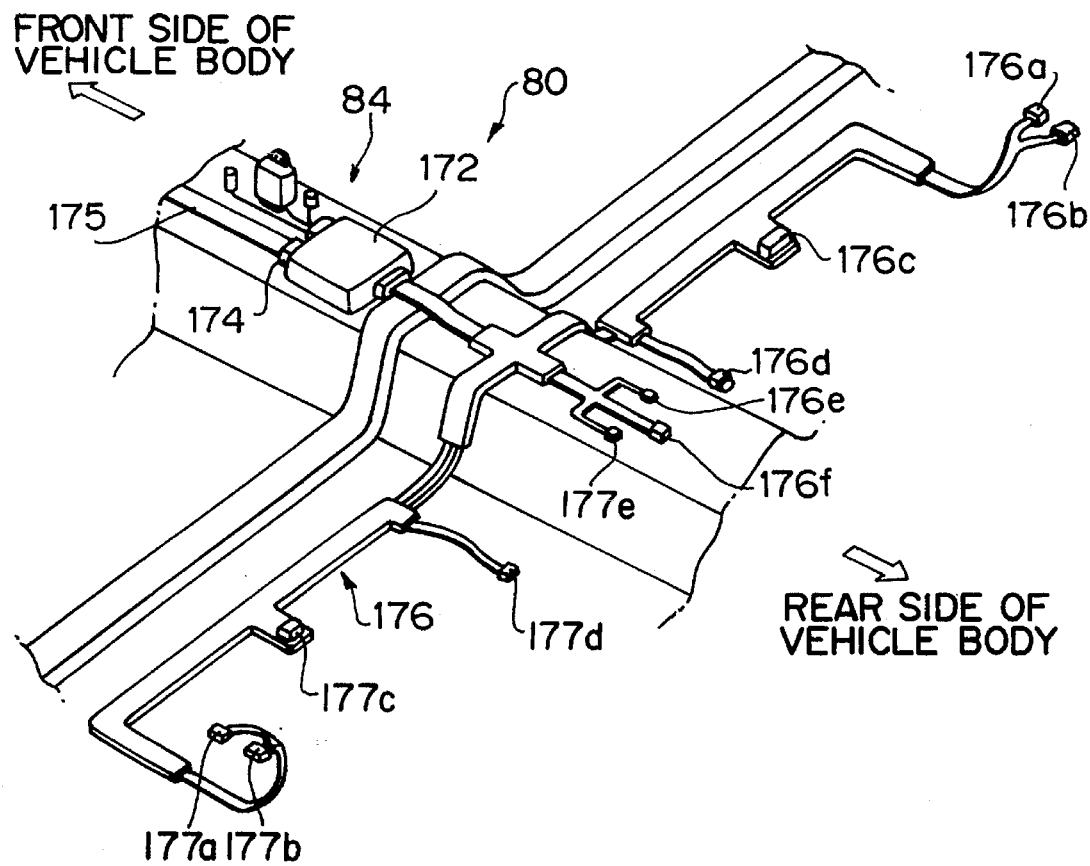
FIG. 7 is a perspective view showing a wiring harness structure of a center console unit.

FIG. 7 is a perspective view showing the wiring harness structure of the center console unit 80 arranged in the floor block 20.

An ECU module 172 constituting the main body portion of the control node 84 of the center console unit 80 is arranged at a forwardly offset position in the center console unit 80. A communication line 175 is connected to the front side of the ECU module 172 through a connector 174, and the distal end portion of the communication line 175 is connected to the branch wiring harness 66 of the instrument panel unit 19 through the connector 85. A branch wiring harness 176 comprising a flat cable is connected to the rear side of the ECU module 172 through a connector, and is fixed to the floor to extend in the widthwise direction of the vehicle body. The branch wiring harness 176 comprises connectors 176*a* and 177*a* for connecting a door switch, connectors 176*b* and 177*b* for connecting an ELR solenoid (Emergency Locking Retractor solenoid), connectors and 176*c* and 177*c* for connecting a seat warmer, connectors 176*d* and 177*d* for connecting a buckle switch, connectors 176*e* and 177*e* for connecting a seat warmer switch, a connector 176*f* for connecting a hand brake switch, and the like. These connectors are connected to the above-mentioned electrical components, and communications between these electrical components and other blocks are controlled by the ECU module 172.

Figure 8A:
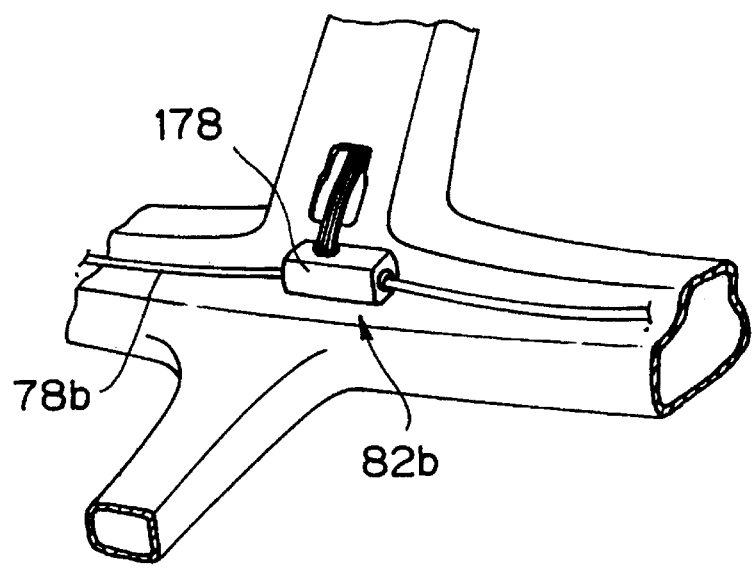
FIGS. 8A and 8B are perspective views showing an arrangement of a branch box.
Figure 8B:
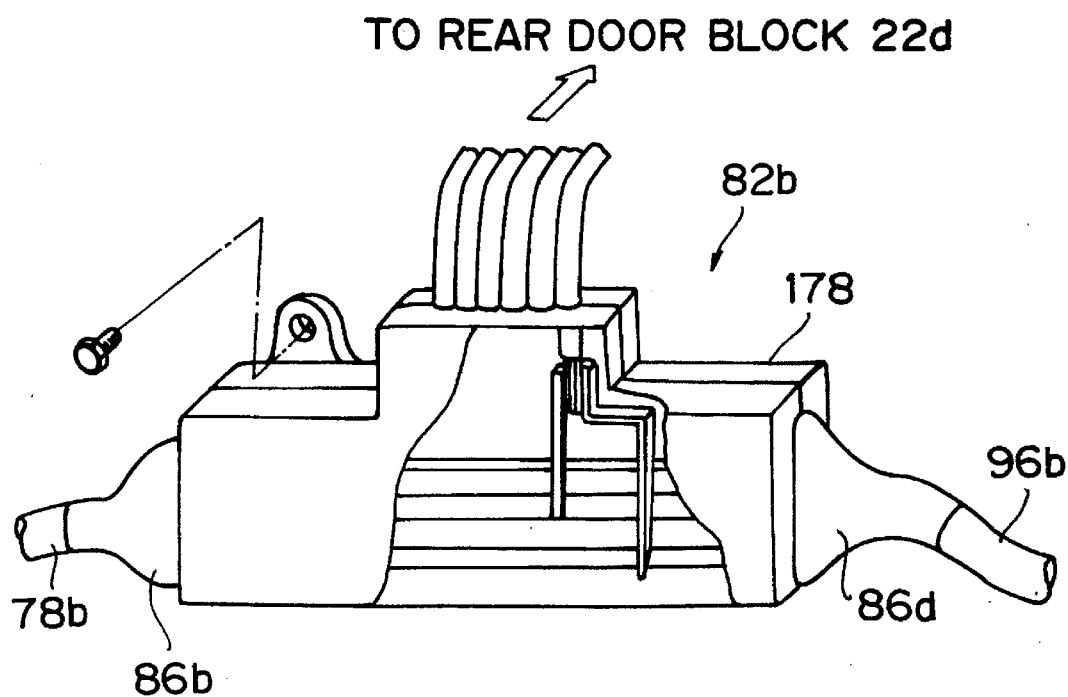

FIGS. 8A and 8B are perspective views showing the arrangement of a branch box 178 constituting the main body portion of the right floor control node 82*b*.

The trunk wiring harness 78*b* is connected to the front portion of the branch box 178 through the connector 86*b*, and the trunk wiring harness 96*b* is connected to the rear portion of the branch box 178 through the connector 86*d*. Signal lines in these trunk wiring harnesses are branched upward, as shown in FIG. 8A, in the branch box 178. The branched signal lines and power lines arranged in the trunk wiring harnesses 78*b* and 96*b* in addition to the signal lines are aligned in the form of a flat cable, and are then connected to the rear right door block 22*d* through a connector 86*e*.

An ECU module (not shown) is attached to the branch box 178, and controls communications of electrical components connected to the floor control node 82*b* and arranged at the floor block 20 side.

Figure 9:
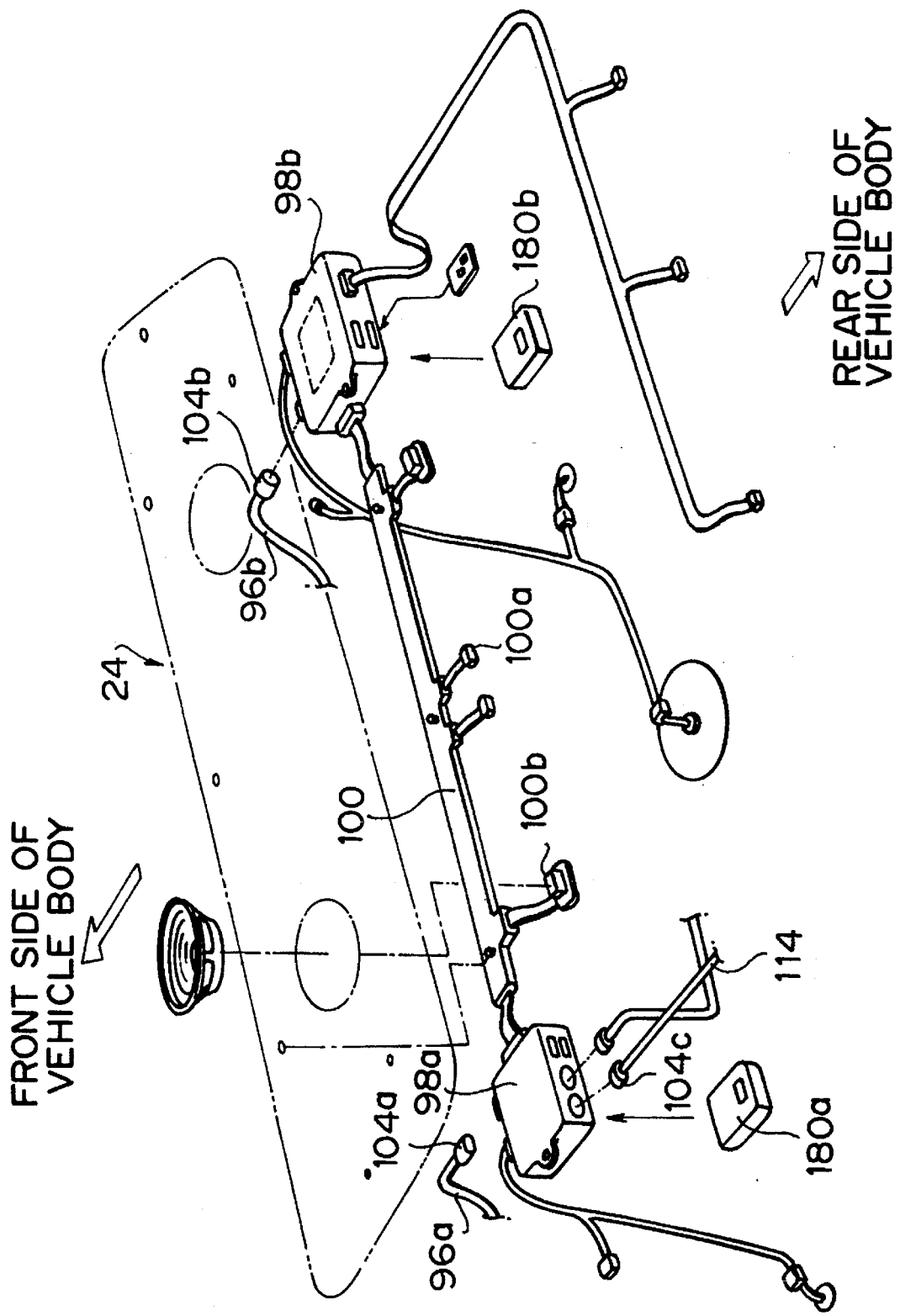
FIG. 9 is a perspective view showing a wiring harness structure of a rear block.

FIG. 9 is a perspective view showing the wiring harness structure of the rear block 24.

The trunk wiring harnesses 96*b* and 96*a* are connected to the front portions of the rear control nodes 98*b* and 98*a* arranged at the right and left end portions of the rear block 24. The flat-cable-like branch wiring harness 100 is connected between these rear control nodes 98*a* and 98*b* through connectors. The branch wiring harness 100 comprises connectors such as a connector 100*a* for connecting a cargo room lamp, a connector 100*b* for connecting a rear loudspeaker, and the like. The right and left rear control nodes 98*b* and 98*a* are respectively connected to ECU modules 180*b* and 180*a*, which control communications of the electrical components connected to the right and left rear control nodes 98*b* and 98*a*.

The left rear control node 98*a* is connected, through the connector 104*c*, to the trunk wiring harness 114 connected to the tail block 26.

Figure 10:
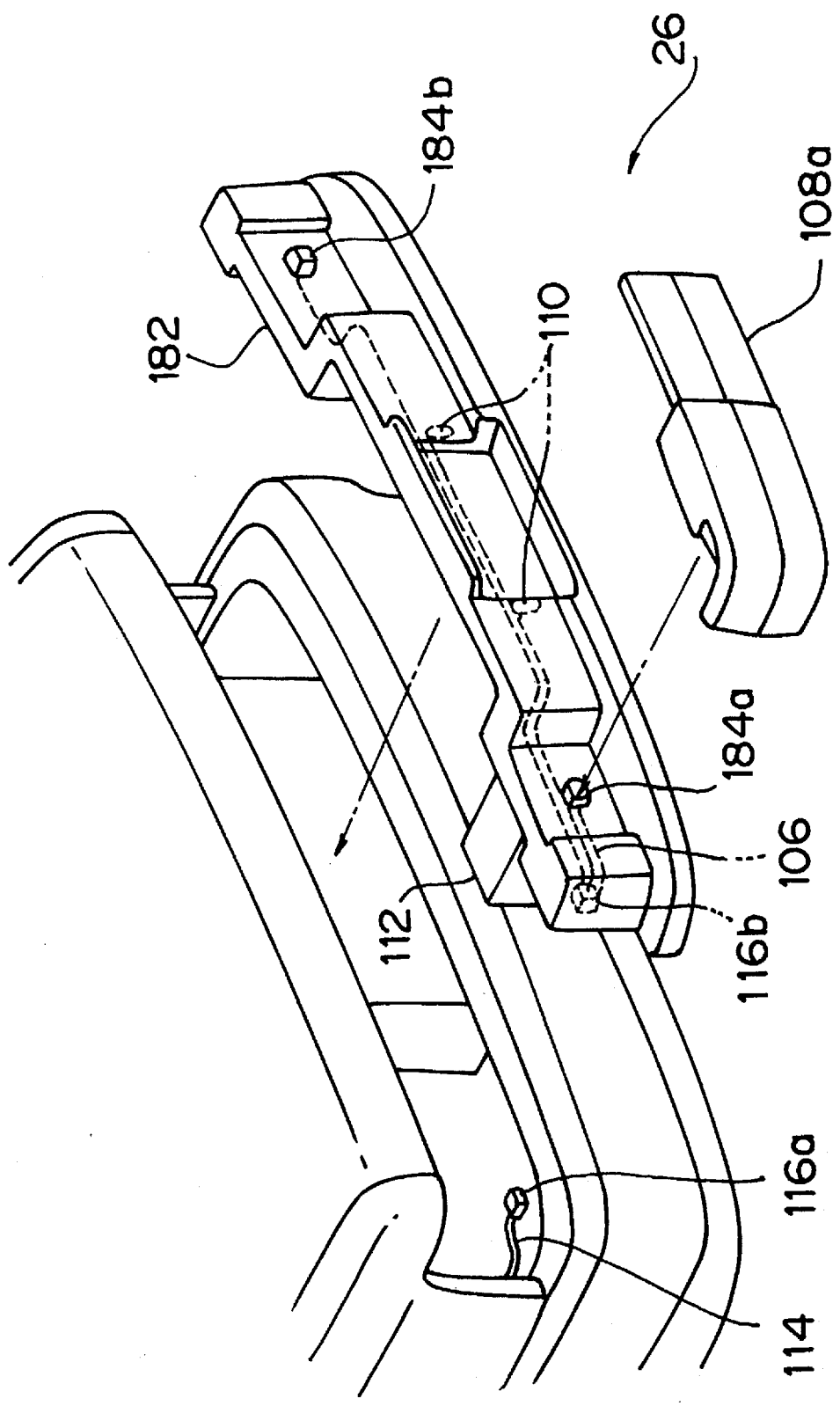
FIG. 10 is an exploded perspective view of a tail block and its peripheral portion.

FIG. 10 is an exploded perspective view of the tail block 26 and its peripheral portion. As shown in FIG. 10, in the tail block 26, the branch wiring harness 106 comprising a flat cable extends in the right-and-left direction in a tail housing 182 to the inner surface of which a box of the control node 112 is attached, and is connected to, e.g., the license plate lamp 110, and the like. A connector 116*b* corresponding to a connector 116*a* arranged at the distal end of the trunk wiring harness 114 connected to the left rear control node 98*a* is arranged at one end of the branch wiring harness 106. Connectors 184*a* and 184*b* for connecting the rear combination lamps 108*a* and 108*b* (see FIG. 1) are arranged on the outer surface of the tail housing 182. When the right and left rear combination lamps 108*b* and 108*a* (see FIG. 1) are attached to the tail housing using these connectors 184*b* and 184*a*, the rear combination lamps 108*a* and 108*b*,(see FIG. 1) the license plate lamp 110, and the control node 112 are connected to the trunk wiring harness 114 constituting the multiplex transmission path by only connecting the connector 116*b* arranged at one end of the branch wiring harness 106 to the connector 116*a* of the trunk wiring harness 114 side.

The typical structures of the trunk wiring harness and the flat cable will be explained below with reference to FIGS. 11 and 12.

Figure 11:
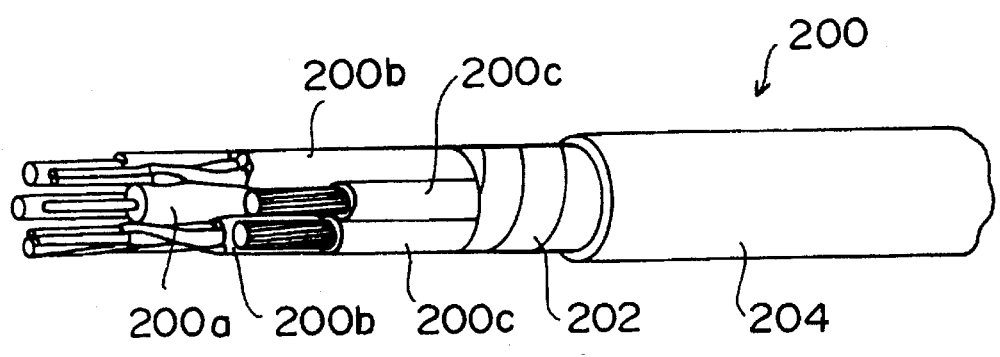
FIG. 11 is a view showing a typical structure of a trunk wiring harness.

FIG. 11 is a view showing the typical structure of the trunk wiring harness.

As shown in FIG. 11, a trunk wiring harness 200 is formed to have a coaxial structure, and inner electric wires are wrapped in a vinyl chloride jacket 204 in a state wherein a twist fixing tape 202 is wound around the electric wires. An optical fiber 200*a* for communicating an audio signal and a video signal are arranged in the central portion of the trunk wiring harness. Signal lines 200*b*, comprising twisted wires, for multiplex transmission, and power lines 200*c* for supplying electric power to the electrical components are arranged around the optical fiber 200*a*. Communications among the electrical components, and electric power supply to these electrical components are performed through the trunk wiring harness 200.

Figure 12:
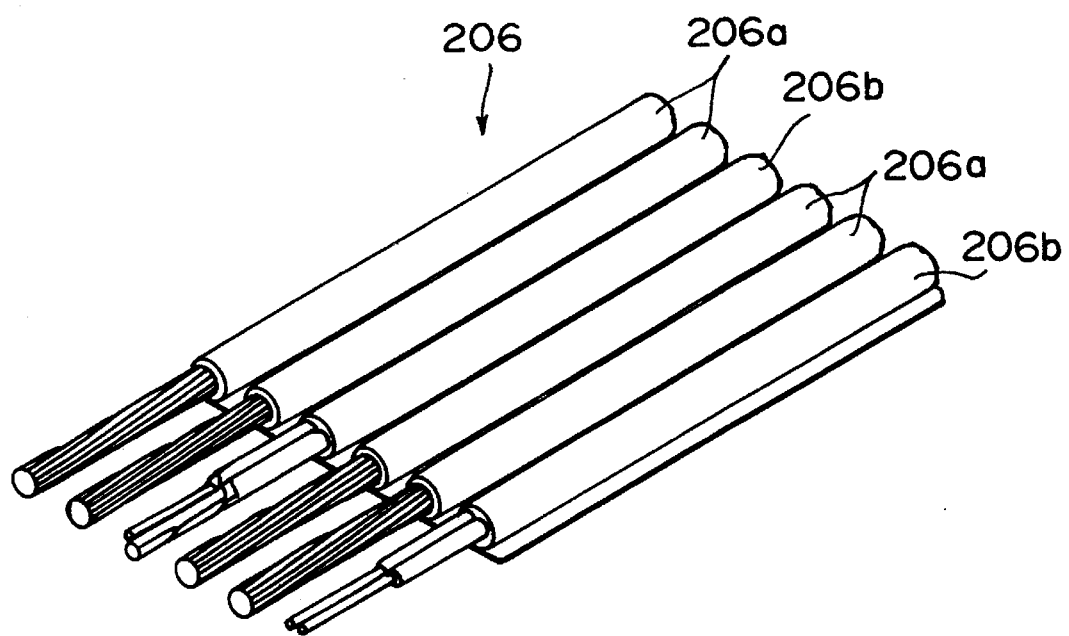
FIG. 12 is a view showing a typical arrangement of a flat cable.

FIG. 12 is a view showing the typical arrangement of the flat cable.

The basic arrangement of a flat cable 206 is substantially the same as that of the trunk wiring harness 200. Power lines 206*a* and signal lines 206*b* comprising twisted wires are aligned to have a flat cable section.

Figure 13:
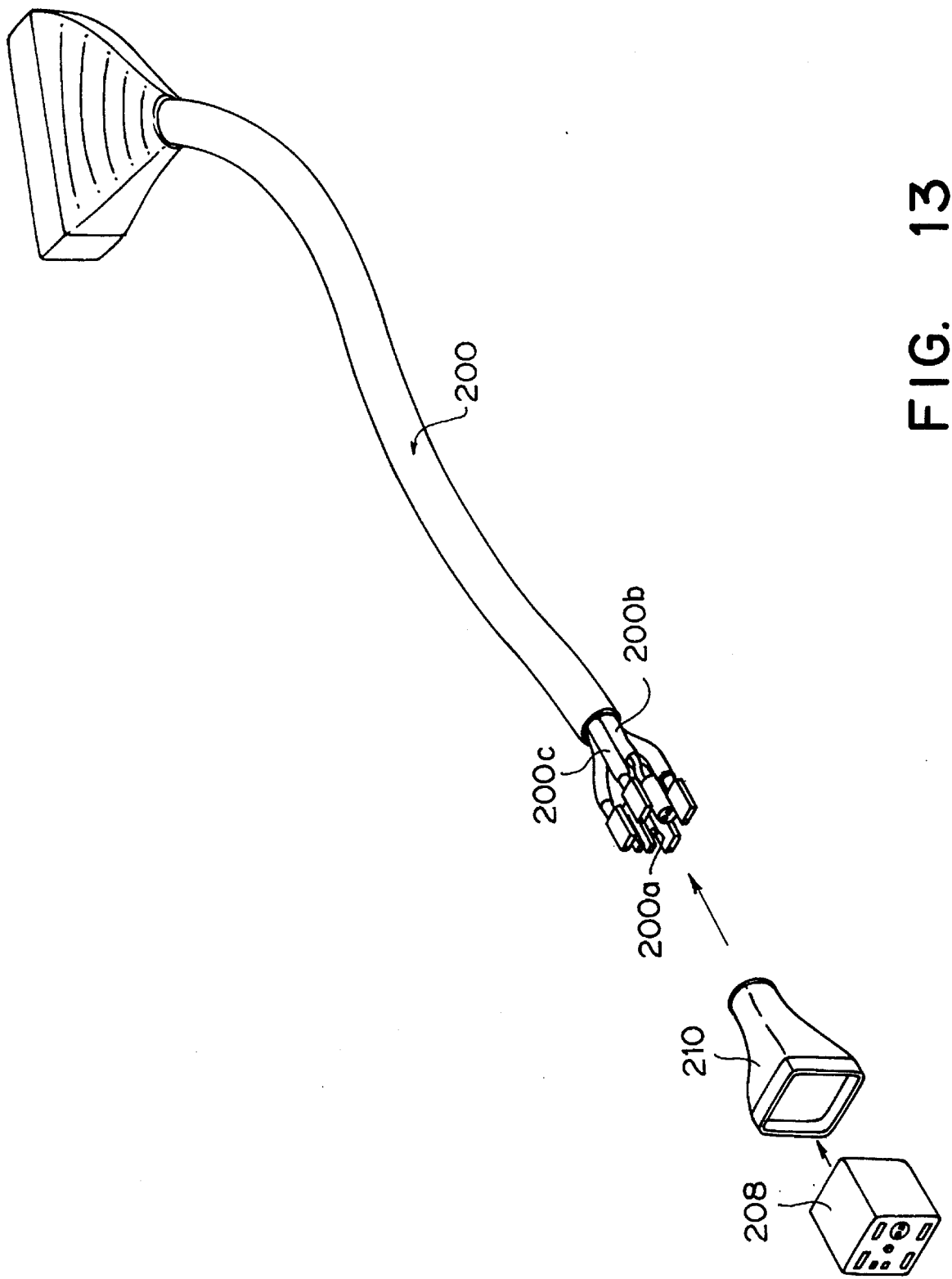
FIG. 13 is a view showing a structure of a connector portion for connecting the trunk wiring harness.

FIG. 13 shows the structure of a connector portion for connecting the trunk wiring harness 200 to, e.g., the cowl node.

As shown in FIG. 13, the optical fiber 200a, the communication lines 200b, and the power lines 200c are fixed to a connector housing 208 in an arrangement shown in FIG. 13, and are covered by a water-proof boot 210.

As described above, according to the embodiment of the electrical wiring harness structure for a vehicle according to the present invention, the multiplex transmission network is applied to the entire vehicle body, and each of modules (blocks) constituting the vehicle body is provided with a block control node for controlling communication of electrical components in the corresponding module, thus forming an independent communication network in units of modules. In this manner, communications among the modules can be attained by a small number of wires including communication lines comprising twisted wires. When compact and simple connectors are arranged between the adjacent modules, the modules can be combined after they are independently assembled. Thus, the vehicle body can be assembled in units of modules.

Since the multiplex transmission network itself has a check function of determining whether or not electrical components are connected, connection errors of connectors can be smoothly found.

Since a main block control node has both a function of branching a transmission path to a sub block control node, and a communication function associated with electrical components connected to itself, the arrangement of the multiplex transmission network can be simplified as compared to a case wherein branch portions comprising branch connectors for merely branching signal lines, and control nodes for controlling communications of electrical components near the branch portions are separately arranged.

The present invention can be applied to various changes and modifications of the above embodiment, which are made within the spirit and scope of the invention.

The present invention is not limited to the above embodiments and various changes and modifications can be made within the spirit and scope of the invention. Therefore, to apprise the public of the scope of the present invention the following claims are made.

What is claimed is:

1. An electrical wiring harness structure for a multiplex transmission network in a vehicle, in which a vehicle body is divided into a plurality of blocks, electrical components are mounted in units of the blocks to constitute modules, and the modules are combined to complete a vehicle body, the electrical wiring harness structure comprising:

main block control nodes which are respectively provided in modules abutting each other in the vehicle;

trunk wiring harnesses arranged in a front-rear direction of the vehicle connecting main block control nodes, and forming a transmission path for performing communications among said main block control nodes;

first connectors for connecting said trunk wiring harnesses and said main block control nodes;

branch wiring harnesses branched from said main block control nodes in a transverse direction of the vehicle;

subordinate block control nodes connected to said main block control nodes by said branch wiring harnesses; and second connectors for connecting said branch wiring harnesses and said subordinate block control nodes, wherein said vehicle body is divided into at least an engine room block, a passenger room block, and a rear block, wherein said main block control nodes comprise right and left cowl nodes having a function of controlling communications among electrical components arranged in said engine room block, electrical components arranged in said passenger room block, and electrical components arranged behind said passenger room block, which are arranged at right and left portions, facing a passenger room, of said engine room block, and wherein said right and left cowl nodes are connected through a branch wiring harness.

2. The structure as recited in claim 1, wherein various electrical components are connected to said branch wiring harnesses.

3. The structure according to claim 2, wherein said branch wiring harness comprises a flat cable.

4. An electrical wiring harness structure for a multiplex transmission network in a vehicle, in which a vehicle body is divided into a plurality of blocks, electrical components are mounted in units of the blocks to constitute modules, and the modules are combined to complete a vehicle body, the electrical wiring harness structure comprising:

main block control nodes which are respectively provided in modules abutting each other in the vehicle;

trunk wiring harnesses arranged in a front-rear direction of the vehicle connecting main block control nodes, and forming a transmission path for performing communications among said main block control nodes;

first connectors for connecting said trunk wiring harnesses and said main block control nodes;

branch wiring harnesses branched from said main block control nodes in a transverse direction of the vehicle;

subordinate block control nodes connected to said main block control nodes by said branch wiring harnesses; and second connectors for connecting said branch wiring harnesses and said subordinate block control nodes, wherein said trunk wiring harnesses comprises a left trunk wiring harness arranged at the left side of said vehicle body, and a right trunk wiring harness arranged at the right side of said vehicle body, and wherein a plurality of pairs of right and left main block control nodes are arranged in said vehicle body, the main block control nodes each constituting one node of each pair of right and left main block control nodes are connected through a branch wiring harness extending in a transverse direction of said vehicle body, the main block control nodes arranged at the left side of said vehicle body are connected through said left trunk wiring harness, and the main block control nodes arranged at the right side of said vehicle body are connected through said right trunk wiring harness.

5. The structure according to claim 4, wherein said vehicle body is divided into at least an engine room block, a passenger room block, and a rear block.

6. The structure according to claim 5, wherein said main block control nodes comprise right and left cowl nodes having a function of controlling communications among electrical components arranged in said engine room block, electrical components arranged in said passenger room block, and electrical components arranged behind said passenger room block, which are arranged at right and left portions, facing a passenger room, of said engine room block.

7. The structure according to claim 6, wherein each of said cowl nodes comprises a branch box for branching a communication line from the trunk wiring harness to the subordinate block control node, an electrical control unit module for controlling communications among the electrical components, and a fuse box in which fuses of the electrical components are concentrated.

8. The structure according to claim 7, wherein said fuse box is detachable from each of said cowl nodes.

9. The structure according to claim 5, wherein a front end block on which electrical components located at a front portion of said vehicle body are mounted is connected to a front side of said engine room block.

10. The structure according to claim 5, wherein floor control nodes comprising main block control nodes having a function of branching signal lines from said trunk wiring harness to door portions are arranged near door mounting portions in said passenger room block.

11. The structure according to claim 5, wherein a tail block is connected to a rear side of said luggage room block.

12. The electrical wiring harness structure according to claim 4, wherein said main block control nodes are provided in the vicinity of a connecting portion between a module where a main block control node is provided and an adjacent module where a subordinate block control node is connected to said main block control node.

13. The electrical wiring harness structure according to claim 12, wherein said modules comprise a body module and a door module and some of said main block control nodes are provided at the body module in the vicinity of a connecting portion between the body module and the door module.

14. The structure according to claim 4, wherein each of said right and left trunk wiring harnesses comprises twisted pair wires.

15. An electrical wiring harness structure for a multiplex transmission network in a vehicle, in which a vehicle body is divided into a plurality of blocks, electrical components are mounted in units of the blocks to constitute modules, and the modules are combined to complete a vehicle body, the electrical wiring harness structure comprising:

main block control nodes respectively provided in modules abutting each other in the vehicle;

trunk wiring harnesses arranged in a front-rear direction of the vehicle connecting main block control nodes, and forming a transmission path for performing communications among said main block control nodes;

branch wiring harnesses branched from said main block control nodes;

subordinate block control nodes connected to said main block control nodes by said branch wiring harnesses, wherein said trunk wiring harnesses have a left trunk wiring harness arranged at a left side of said vehicle and a right trunk wiring harness arranged at a right side of said vehicle, and said main block control nodes have right and left cowl nodes arranged at right and left cowl portions of the vehicle, and said right and left cowl nodes are connected to each other through one of said branch wiring harnesses.

16. The structure according to claim 15, wherein said vehicle body is divided into at least an engine room block, a passenger room block, and a rear block.

17. The structure according to claim 16, wherein floor control nodes comprising main block control nodes having a function of branching signal lines from said trunk wiring harness to door portions are arranged near door mounting portions in said passenger room block.

18. The structure according to claim 16, wherein a tail block is connected is connected to a rear side of said luggage room block.

19. The structure according to claim 16, wherein a front end block on which electrical components located at a front portion of said vehicle body are mounted is connected to a front side of said engine room block.

20. The structure according to claim 16, wherein said right and left cowl nodes have a function of controlling communications among electrical components arranged in said engine room block, electrical components arranged in said passenger room block, and electrical components arranged behind said passenger room block, which are arranged at right and left portions, facing a passenger room, of said engine room block.

21. The structure according to claim 20, wherein each of said cowl nodes comprises a branch box for branching a communication line from the trunk wiring harness to the subordinate block control node, an electrical control unit module for controlling communications among the electrical components, and a fuse box in which fuses of the electrical components are concentrated.

22. The structure according to claim 21, wherein said fuse box is detachable from each of said cowl nodes.

23. The structure according to claim 20, wherein various electrical components are connected to said branch wiring harnesses.

24. The structure according to claim 23, wherein said branch wiring harnesses comprise a flat cable.

25. The structure according to claim 15, wherein each of said right and left trunk wiring harnesses comprises twisted pair wires.

26. The structure according to claim 15, wherein a plurality of pairs of right and left main block control nodes are arranged in said vehicle body, the main block control nodes each constituting one node of each pair of right and left main block control nodes are connected through a branch wiring harness extending in a widthwise direction of said vehicle body, the main block control nodes arranged at the left side of said vehicle body are connected through said left trunk wiring harness, and the main block control nodes arranged at the right side of said vehicle body are connected through said right trunk wiring harness.

27. The electrical wiring harness structure according to claim 15, wherein said main block control nodes are provided in the vicinity of a connecting portion between a module where a main block control node is provided and an adjacent module where a subordinate block control node is connected to said main block control node.

28. The electrical wiring harness structure as recited in claim 20, wherein said right and left cowl nodes are arranged in the vicinity of connecting portions between a body module and right and left front door modules; and right and left door nodes am arranged at said right and left front door modules and are connected to said right and left cowl nodes through branch wiring harnesses from said right and left cowl nodes.

29. The structure according to claim 28, wherein said vehicle body is divided into at least an engine room block, a passenger room block, and a rear block.

30. The structure according to claim 29, wherein floor control nodes comprising main block control nodes having a function of branching signal lines from said trunk wiring harness to door portions are arranged near door mounting portions in said passenger room block.

31. The structure according to claim 29, wherein a tail block is connected to a rear side of said rear room block.

32. The structure according to claim 29, wherein a front end block on which electrical components located at a front portion of said vehicle body are mounted is connected to a front side of said engine room block.

33. The structure according to claim 29, wherein said right and left cowl nodes have a function of controlling communications among electrical components arranged in said engine room block, electrical components arranged in said passenger room block, and electrical components arranged behind said passenger room block, which are arranged at right and left portions, facing a passenger room, of said engine room block.

34. The structure according to claim 33, wherein each of said cowl nodes comprises a branch box for branching a communication line from the trunk wiring harness to the subordinate block control node, an electrical control unit module for controlling communications among the electrical components, and a fuse box in which fuses of the electrical components are concentrated.

35. The structure according to claims 34, wherein said fuse box is detachable from each of said cowl nodes.

36. The structure according to claim 33, wherein said right and left cowl nodes are connected through a branch wiring harness.

37. The structure according to claim 36, wherein various electrical components are connected to said branch wiring harness.

38. The structure according to claim 37, wherein said branch wiring harness comprises a flat cable.

39. The structure according to claim 28, wherein each of said right and left trunk wiring harnesses comprise twisted pair wires.

40. The structure according to claim 28, wherein a plurality of pairs of right and left main block control nodes are arranged in said vehicle body, the main block control nodes each constituting one node of each pair of right and left main block control nodes are connected through a branch wiring harness extending in a widthwise direction of said vehicle body, the main block control nodes arranged at the left side of said vehicle body are connected through said left trunk wiring harness, and the main block control nodes arranged at the right side of said vehicle body are connected through said right trunk wiring harness.

41. The electrical wiring harness structure according to claim 28, wherein said main block control nodes are provided in the vicinity of a connecting portion between a module where a main block control node is provided and an adjacent module where a subordinate block control node is connected to said main block control node.

42. The electrical wiring harness structure according to claim 28, wherein at least one subordinate block control node is connected to said branch wiring harness which connects the right and left cowl nodes.

* * * * *